(12) United States Patent
Lillesveen

(10) Patent No.: US 9,805,009 B2
(45) Date of Patent: Oct. 31, 2017

(54) METHOD AND DEVICE FOR CASCADING STYLE SHEET (CSS) SELECTOR MATCHING

(75) Inventor: Rune Lillesveen, Rælingen (NO)

(73) Assignee: OPERA SOFTWARE AS, Oslo (NO)

( * ) Notice: Subject to any disclaimer, the term of this patent is extended or adjusted under 35 U.S.C. 154(b) by 68 days.

(21) Appl. No.: 13/340,411

(22) Filed: Dec. 29, 2011

(65) Prior Publication Data
US 2012/0173967 A1 Jul. 5, 2012

Related U.S. Application Data

(60) Provisional application No. 61/428,247, filed on Dec. 30, 2010.

(51) Int. Cl.
*G06F 17/00* (2006.01)
*G06F 17/22* (2006.01)
*G06F 17/30* (2006.01)
*G06F 17/21* (2006.01)
*G06F 17/24* (2006.01)

(52) U.S. Cl.
CPC ........ *G06F 17/227* (2013.01); *G06F 17/2247* (2013.01); *G06F 17/211* (2013.01); *G06F 17/218* (2013.01); *G06F 17/24* (2013.01); *G06F 17/3089* (2013.01); *G06F 17/30905* (2013.01)

(58) Field of Classification Search
CPC .. G06F 17/2247; G06F 17/227; G06F 17/218; G06F 17/2264; G06F 17/24; G06F 17/211; G06F 17/3089; G06F 17/30905; A01B 12/006
USPC .................................. 715/234–235, 762–765
See application file for complete search history.

(56) References Cited

U.S. PATENT DOCUMENTS

| | | | |
|---|---|---|---|
| 8,543,907 B1 * | 9/2013 | Roskind | G06F 8/443 715/234 |
| 2002/0178437 A1 * | 11/2002 | Blais et al. | 717/140 |
| 2009/0106296 A1 * | 4/2009 | Sickmiller | G06F 17/30876 |
| 2010/0058172 A1 * | 3/2010 | Soldan | G06F 17/2252 715/235 |
| 2010/0269096 A1 * | 10/2010 | Araya et al. | 717/113 |
| 2012/0110437 A1 * | 5/2012 | Pan | G06F 17/30902 715/235 |

* cited by examiner

*Primary Examiner* — Quoc A Tran
(74) *Attorney, Agent, or Firm* — Birch, Stewart, Kolasch & Birch, LLP

(57) ABSTRACT

The present invention relates to a computer-implemented method for Cascading Style Sheet (CSS) selector matching. The method comprises: generating machine code based on text which includes at least one CSS selector; and executing the machine code to perform the CSS selector matching. The present invention also relates to a corresponding computer device and a computer readable storage medium.

18 Claims, 4 Drawing Sheets

METHOD AND DEVICE FOR CASCADING STYLE SHEET (CSS) SELECTOR MATCHING

CROSS REFERENCES TO RELATED APPLICATIONS

This nonprovisional application claims the benefit of U.S. Provisional Application No. 61/428,247 filed on Dec. 30, 2010. The entire contents of the above application is hereby incorporated by reference into the present application.

TECHNICAL FIELD

The present invention relates to a method for Cascading Style Sheet (CSS) selector matching. The present invention also relates to a corresponding computer device and a computer readable storage medium

BACKGROUND OF THE INVENTION

Computer users typically use user agent applications such as web browsers to access documents and other resources that are available over a computer network, e.g., the World Wide Web. Resources available on the World Wide Web (also referred to simply as "the Web") are generally stored in documents called web pages. Such web pages are identified by a Uniform Resource Identifier (URI), usually a Uniform Resource Locator (URL), which identifies the web page uniquely and provides the information necessary for locating and accessing the web page.

A web browser is a computer program that, when executed on a client computer, enables the client computer to read and display web pages. A web browser includes a user interface component for addressing a particular server on a network, and designating a particular document (e.g., a web page) to be obtained from the addressed server. Using the Hypertext Transfer Protocol (HTTP), a web browser may fetch the designated documents from the server. Also, a web browser includes a component for displaying the content of web pages.

In particular, web browsers are operable to display the content of web pages, which are formatted as markup language documents. "Markup language document" generally refers to a text file that includes "markup tags." In particular, markup tags tell the web browser how to display the web page. Such tags are used to define hypertext links, specify format changes, or otherwise indicate how particular elements in the web page should be displayed. Examples of markup language documents are Hypertext Markup Language (HTML), extensible Hypertext Markup Language (XHTML), and extensible Markup Language (XML) documents.

Cascading Style Sheet or Cascading Style Sheets (CSS) is a language used to describe the presentation style (e.g. fonts, colors, spacing) of a document written in a markup language (ML). Rule sets, or rules, consisting of selectors and declaration blocks, are used to determine how styles should be applied. In CSS, selectors are used to declare which of the markup elements a style applies to, while declaration blocks are used to declare the style. An example of a rule is h1{color: green } where "h1" is the selector and {color: green } is the declaration block. The selector indicates that all elements that are H1 elements (i.e. headings) match this rule, and the declaration block declares that matching elements (H1 headings) should be rendered as green.

Currently, CSS selectors may be parsed into a data structure of e.g. linked lists. This data structure is traversed during selector matching along with the Document Object Model (DOM) to match selectors against DOM nodes or elements. For m DOM nodes or elements and n CSS selectors, m×n matches may typically be required. The result of the matching may be that the DOM node or element is shown in a web browser with the style described by the matched selector.

CSS selector matching is currently a major bottleneck in web browsers in general, and CSS stylesheets tend to be increasingly large on real web sites.

Alternatives to make CSS selector matching faster is to more effectively prune selectors that cannot possibly match a given DOM element.

SUMMARY OF THE INVENTION

The present invention is defined in the attached independent claims. Embodiments are defined in the attached dependent claims.

According to an aspect of the present invention, there is provided a method for Cascading Style Sheet (CSS) selector matching, which method comprises: generating machine code based on text which includes at least one CSS selector; and executing the machine code to perform the CSS selector matching.

The present invention allows for faster execution of CSS selector matching, and a better web browser performance may be provided.

Executing the machine code to perform the CSS selector matching may further comprise or be comprised in: invoking the machine code for a given CSS selector and a given Document Object Model (DOM) node or element, the DOM representing a document (e.g. HTML) for which CSS selector match is to be carried out.

The machine code may be generated directly from the text which includes at least one CSS selector.

Alternatively, generating machine code based on the text which includes at least one CSS selector may comprise: parsing the text which includes at least one CSS selector into a data structure representing the at least one CSS selector; and compiling the data structure into the machine code.

The data structure may for instance be a byte-code or an Abstract Syntax Tree (AST), and the data structure may be compiled into the machine code using Just In Time (JIT) compilation. Further, the text may include several CSS selectors, wherein only some selectors are compiled based on use of the selectors (the other selectors may be kept as an internal data structure that is interpreted when performing selector matching). Generating machine code is generally more time consuming than generating a simple data structure for the selector. A purpose of JIT here is to take the "overhead cost" of generating machine code for selectors that are used for matching often, and never generate the machine code for selectors that are not used, or used very little.

Further, parsing the text which includes at least one CSS selector into the data structure may comprise: translating each simple constituent of the text which includes at least one CSS selector into one or more byte-code instructions; and translating combinators of the text which includes at least one CSS selector into control flow instructions and instructions for picking candidate nodes or elements from the DOM for matching. A 'simple constituent' may for instance be a type selector, a universal selector, an attribute selector, a class selector, an ID selector, a pseudo-element, or a pseudo-class. A 'combinator' may for instance be a descendant, a child, or a sibling.

The method may further comprise: executing or interpreting the data structure (e.g. byte-code or AST) to perform the CSS selector matching, i.e. without compiling the data structure into machine code.

According to another aspect of the present invention, there is provided a computer device for CSS selector matching, which device comprises: means for generating machine code based on text which includes at least one CSS selector; and an execution engine adapted to execute the machine code to perform the CSS selector matching. This aspect may exhibit the same or similar features and technical effects as the previously described aspect, and vice versa.

Said means may comprise a generator adapted to generate machine code directly based on text which includes at least one CSS selector Alternatively, said means may comprise: a CSS parser adapted to parse the text which includes at least one CSS selector into a data structure representing the at least one CSS selector, such as a byte-code or an AST; and a compiler adapted to compiling the data structure into machine code for the particular architecture of the computer device, wherein the execution engine is adapted to invoke the machine code for a given CSS selector and a given DOM node or element.

According to yet another aspect of the present invention, there is provided a computer readable storage medium having code or instructions, which code or instructions when executed on a computer cause(s) a process that includes: generating machine code based on text which includes at least one CSS selector; and executing the machine code to perform CSS selector matching. This aspect may exhibit the same or similar features and technical effects as the previously described aspects, and vice versa.

DETAILED DESCRIPTION

Figure 1:
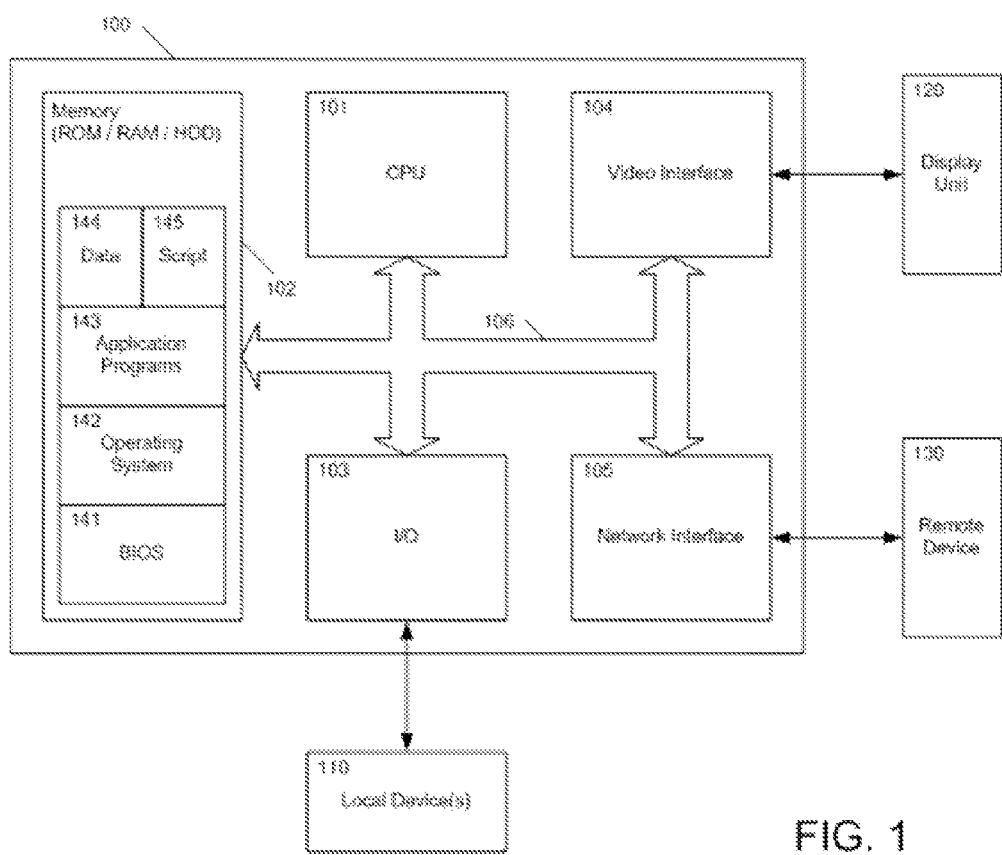
FIG. 1 is a computing device that can be used to implement an exemplary embodiment of the present invention.

FIG. 1 illustrates a generalized computing device 100 that can be used as an environment for implementing various aspects of the present invention. In FIG. 1, a device 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145.

The communication ports 103 may be connected to one or more local devices 110 such as user input devices, a printer, a media player, external memory devices, and special purpose devices, for example, a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120 which may be an external monitor or an integrated display such as an LCD display. The display unit 120 may have a touch sensitive screen and, in that case, the display unit 120 doubles as a user input device. The user input device aspects of the display unit 120 may be considered as one of the local devices 110 communicating over a communication port 103.

The network interface device 105 provides the device 100 with the ability to connect to a network in order to communicate with an external server 130 and other remote devices 140. The communication network, which in FIG. 1 is only illustrated as the line connecting the network interface 105 with the remote device 130, may be, e.g., a local area network or the Internet. The external server 130 may in principle be any computing device providing services over a network, but typically be a web server providing services over the World Wide Web.

It will be understood that the device 100 illustrated in FIG. 1 is not limited to any particular configuration or embodiment regarding its size, resources, or physical implementation of components. For example, more than one of the functional components illustrated in FIG. 1 may be combined into a single integrated unit of the device 100. Also, a single functional component of FIG. 1 may be distributed over several physical units. Other units or capabilities may of course also be present. Furthermore, the device 100 may, e.g., be a general purpose computer such as a PC, or a personal digital assistant (PDA), or even a cellphone or a smartphone.

Figure 2:
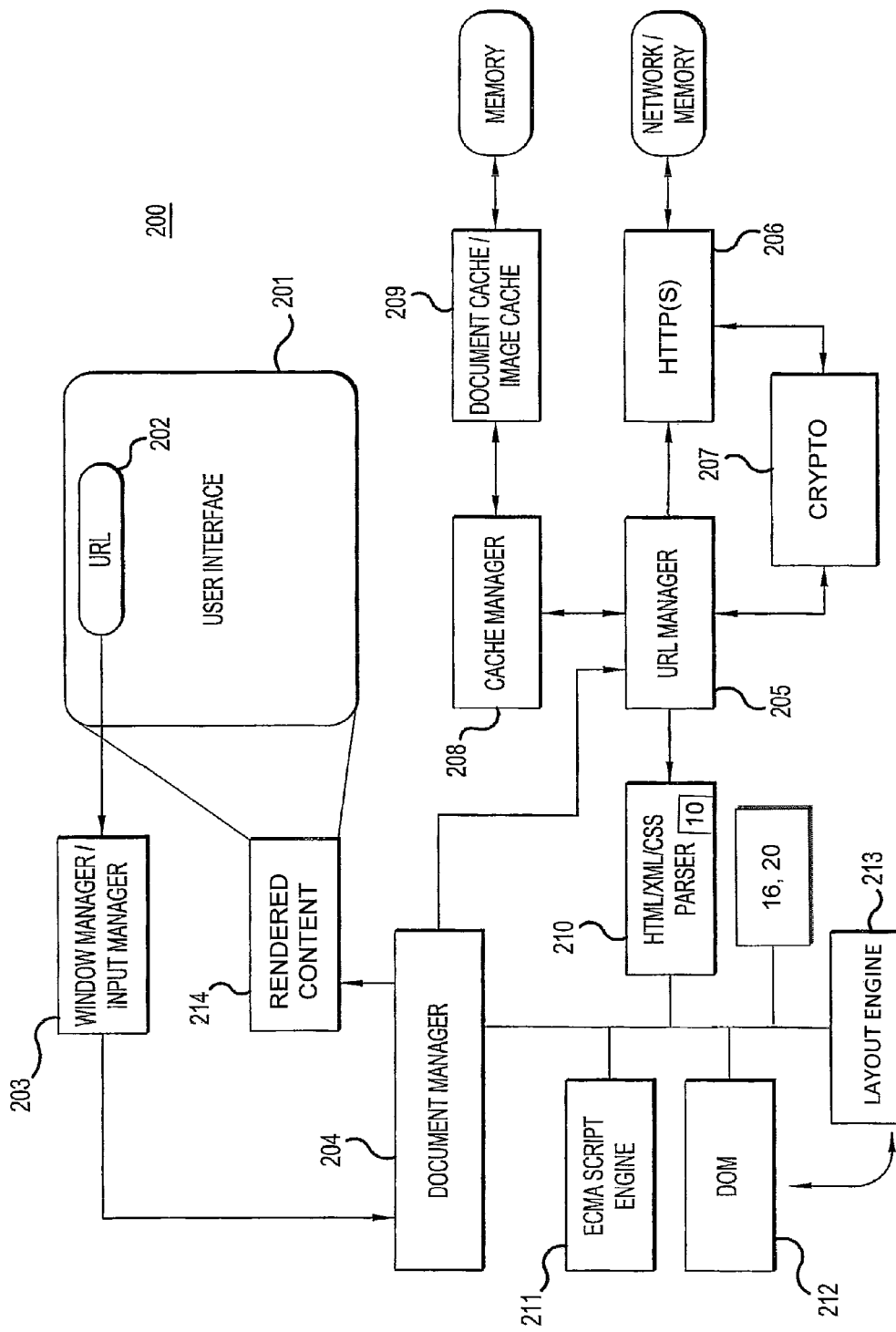
FIG. 2 is a user agent for accessing data resources in accordance with an exemplary embodiment of the present invention.

In an exemplary embodiment, various aspects of the present invention may be incorporated into, or used in connection with, the components and/or functionality making up a user agent or browser installed as an application on a device 100. FIG. 2 shows an example of a number of modules that may be present in such a user agent or browser. The modules will typically be software modules, or otherwise implemented by a programmer in software, and may be executed by the CPU 101. However, it is also possible for any of the modules of FIG. 2 to be implemented as hardware, a combination of hardware and software, or "firmware," as will be contemplated by those skilled in the art.

The user agent or browser 200 presents the user with a user interface 201 that may be displayed on the display unit 120 shown in FIG. 1. The user interface 201 may include an address field 202 where the user may input or select the URL of a document or a service he or she wants the user agent 200 to retrieve. For example, the user may use an input device (e.g., keyboard) to type in the URL in the address field 202. The address field 202 may also be a link that is displayed and may be activated by the user using a pointing device such as a mouse. Alternatively the URL may be specified in the code of a document or script already loaded by the user agent 200.

In any case, the URL may be received by a window and input manager 203 that represents the input part of the user interface 201 associated with, or part of, the user agent 200. The URL may then be forwarded to a document manager 204, which manages the data received as part of the document identified by the URL.

The document manager 204 forwards the URL to a URL manager 205, which instructs a communication module 206 to request access to the identified resource. The communication module 206 may be capable of accessing and retrieving data from a remote device 130 such as an external server over a network using the hypertext transfer protocol (HTTP), or some other protocol such as HTTPS or FTP. The communication module 206 may also be capable of accessing data that is stored in local memory 102.

If communication outside the device 100 is required to be encrypted, e.g., as specified by the protocol used to access the URL, encryption/decryption module 207 handles communication between the URL manager 205 and the communication module 206.

The data received by the communication module 206 in response to a request is forwarded to the URL manager 205. The URL manager 205 may then store a copy of the received content in local memory 102 using a cache manager 208 which administers a document and image cache 209. If the same URL is requested at a later time, the URL manager 205 may request it from the cache manager 208, which will retrieve the cached copy from the cache 209 (unless the cached copy has been deleted) and forward the cached copy to the URL manager 205. Accordingly, it may not be necessary to retrieve the same data again from a remote device 130 when the same URL is requested a second time.

The URL manager 205 forwards the data received from the communication module 206 or cache 209 to a parser 210 capable of parsing content such as HTML, XML and CSS. The parsed content may then, depending on the type and nature of the content, be processed further by a ECMAScript engine 211 (e.g., a JavaScript engine), a module for handling a document object model (DOM) structure 212, and/or a layout engine 213.

This processing of the retrieved content is administered by the document manager 204, which may also forward additional URL requests to the URL manager 205 as a result of the processing of the received content. These additional URL's may, e.g., specify images or other additional files that should be embedded in the document specified by the original URL.

When the data representing the content of the specified document has been processed, it is forwarded from the document manager 204 in order to be rendered by a rendering engine 214 and displayed on the user interface 201.

The ECMAScript engine 211 described above may be implemented as a JavaScript engine, i.e., a particular type of interpreter for interpreting JavaScript source code and executing the script accordingly. JavaScript is often considered the originating dialect of ECMAScript (JScript being another such dialect). However, no limitation to any particular dialect of ECMAScript is intended. In fact, in the user agent 200, it is possible to replace the ECMAScript engine 211 of FIG. 2 with another type of script engine which interprets and executes a script language that does not fall under the ECMA-262 specification (i.e., the ECMAScript standard).

The various modules of a user agent 200 thus described are executed by the CPU 101 of device 100 as the CPU 101 receives instructions and data over the system bus(es) 106. The communications module 206 communicates with the remote device 130 using the network interface 105. The functionality of various modules in FIG. 2 may of course be integrated into fewer larger modules. Also, the functionality of a single module in FIG. 2 may be distributed or replicated over several modules.

It will further be understood that, while the user agent 200 described above may be implemented as an application program 143, some of the user agent's 200 functionality may also be implemented as part of the operating system 142 or even the BIOS 141 of the device 100. The content received in response to a URL request may be data 144, script 145, or a combination thereof as further described below.

For purpose of convenience, the terms "user agent," "server agent," "client agent," and "browser" may be used hereinafter to collectively refer to both the components/functionality making up a user agent 200 (as shown in FIG. 2) and the device 100 (as shown in FIG. 1) in which such components/functionality are installed.

Now turning in more detail to the present invention, the present invention relates to a computer implemented method and device for faster execution of CSS selector matching by looking at CSS selectors as programs, and compile the selectors into machine code, for instance using JIT compilation. The selector matching is then done using the generated machine code. This may improve selector matching performance like JIT techniques improves execution performance for programs in Java, ECMAScript and other languages.

Figure 3:
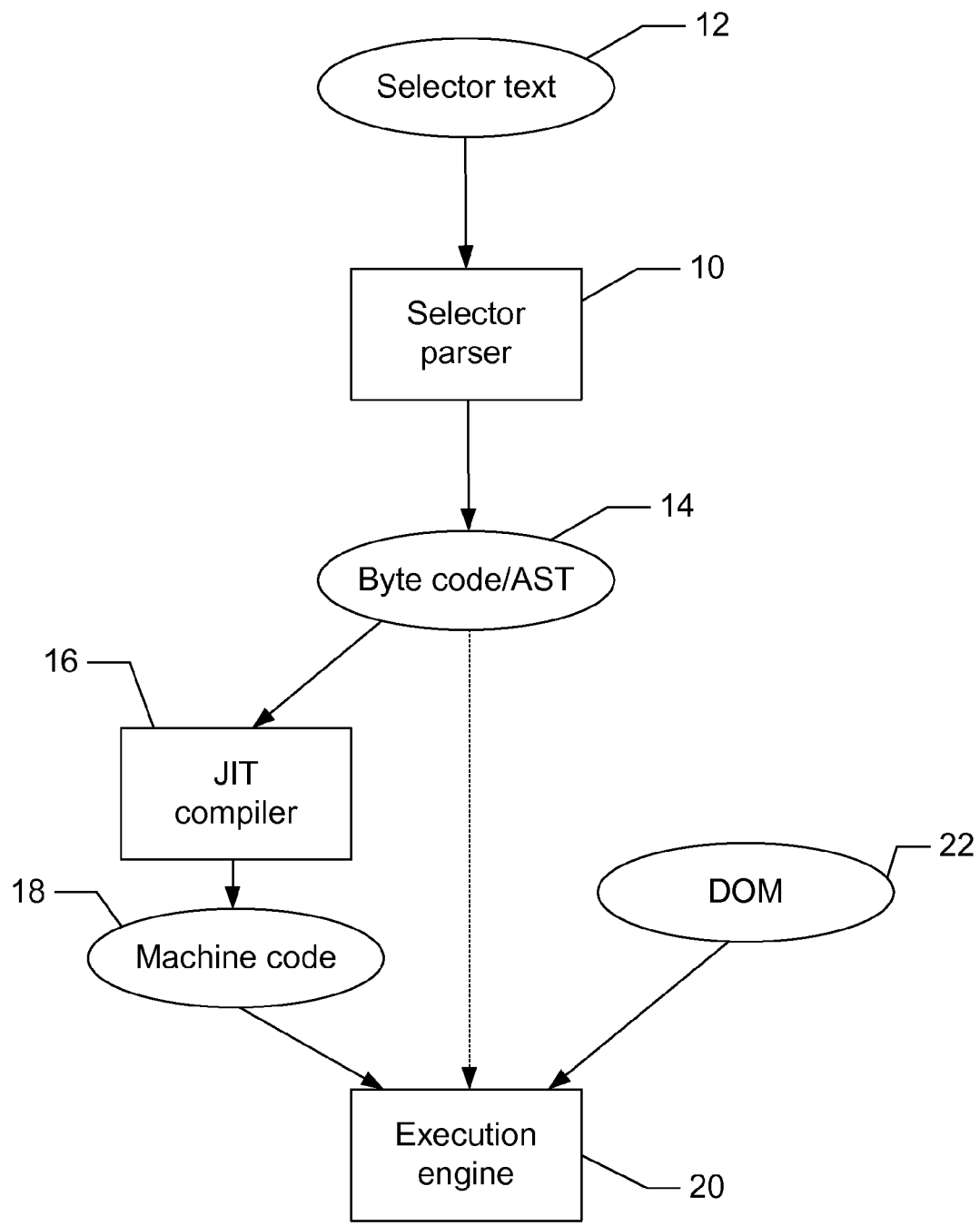
FIG. 3 is a combined flow chart and block diagram which shows how the JIT (Just-In-Time) compiler fits into the processing model for matching CSS selectors with DOM nodes according to an embodiment of the invention. The execution engine is able to both interpret byte-code/AST and invoking machine code generated by the JIT compiler.

With reference to FIG. 3, features of the present invention may include:

A CSS selector parser 10 that parses the CSS selector text 12 into a byte-code or an AST 14. CSS selector text is a textual representation of at least one CSS selector as specified by the W3C (World Wide Web Consortium) in any level of the Selectors specification or any preceding CSS specification. Typically, the text includes or constitutes a plurality of CCS selectors.

A JIT compiler 16 that generates machine code 18 for the computer architecture on which this invention runs. Machine code may generally be regarded as a system of (impartible) instructions that may be executed directly by a computer's central processing unit.

An execution engine 20 that invokes the compiled machine code 18 for a given selector and a given DOM node or element. The DOM is represented by reference sign 22 in FIG. 3. The execution engine 20 may also execute the byte-code/AST 14 for a given selector and a given DOM node or element.

Here it can be noted that invoking generally includes passing of parameters to the executed code for methods/functions/sub-routines and passing back return values. An exemplary method invocation is:

set up parameters (pushed to stack, for instance);

execute the method code; and get the return value back (popped from stack, for instance).

In the context of FIG. 2, the CSS selector parser 10 may form part of the parser 210, while the JIT compiler 16 and execution engine 20 may be connected similar to the ECMAScript engine 211, as illustrated. Alternatively, the execution engine 20 may be a part of the layout engine 213.

Figure 4:
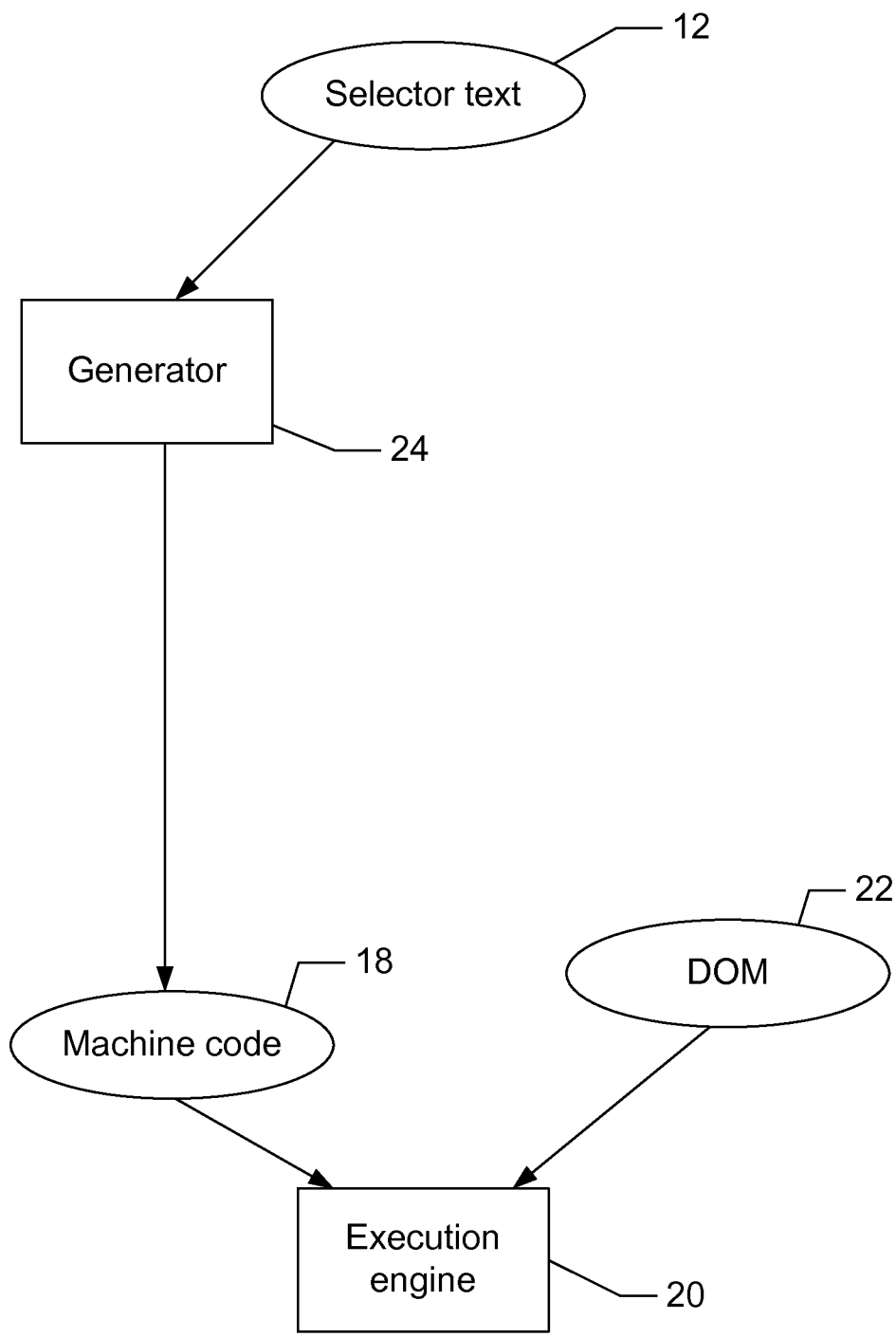
FIG. 4 illustrates another embodiment of the present invention.

In an alternative embodiment shown in FIG. 4, the machine code 18 is generated directly from CSS selector text 12 using a generator 24. In this case, the CSS selector parser 10 and the JIT compiler 16 can be omitted.

The CSS selector parser 10, JIT compiler 16, execution engine 20, and generator 24 may be embodied as software, as hardware, or as a combination or software and hardware.

Compiling Into Byte-Code

A CSS selector can contain a chain of one or more simple selectors separated by combinators, wherein the combinators describe the relationship between the DOM nodes matching the simple selectors.

Roughly, CSS selectors can be compiled into byte-code like this:

Each of the simple selector constituents (type selector, universal selector, attribute selector, class selector, ID selector, pseudo-element or pseudo-class) are translated into one or more byte-code instructions.

The combinators (descendant, child, or sibling) are translated into control flow instructions and instructions for picking candidate elements from the DOM for matching.

Optimizations can be made to the byte-code by optimizing the control flow code that is generated by the combinators, and by looking at general properties of the DOM and the simple selector operations.

The following is an example implementing the matching of two selectors (div a:hover and span+span) in Java virtual machine byte-code. The example first presents the Java code, and then the byte-code generated by a Java compiler, for instance in the selector parser 10. "div a:hover" matches hovered A elements which have a DIV ancestor. "span+span" matches SPAN elements which have a preceding direct sibling which is also a SPAN.

```
/* Java code for "div a:hover" */
boolean match(DOMElement element) {
        if (element.Type( ) != DOMElement.A)
                return false;
        if (!element.IsHovered( ))
                return false;
        element = element.getParent( );
        while (element != null) {
                if (element.Type( ) == DOMElement.DIV)
                        return true;
                element = element.getParent( );
        }
        return false;
}
/* Java code for "span + span" */
boolean match(DOMElement element) {
        if (element.Type( ) == DOMElement.SPAN) {
                element = element.getPred( );
                if (element != null && element.Type( ) == DOMElement.SPAN)
                        return true;
        }
        return false;
}
/* Byte code for "div a:hover" */
boolean match(DOMElement);
    Code:
        0:   aload_1
        1:   invokevirtual    #2; //Method DOMElement.Type:( )I
        4:   iconst_1
        5:   if_icmpeq        10
        8:   iconst_0
        9:   ireturn
       10:   aload_1
       11:   invokevirtual    #3; //Method DOMElement.IsHovered:( )Z
       14:   ifne 19
       17:   iconst_0
       18:   ireturn
       19:   aload_1
       20:   invokevirtual    #4; //Method DOMElement.getParent:( )LDOMElement;
       23:   astore_1
       24:   aload_1
       25:   ifnull 46
       28:   aload_1
       29:   invokevirtual    #2; //Method DOMElement.Type:( )I
       32:   iconst_2
       33:   if_icmpne        38
       36:   iconst_1
       37:   ireturn
       38:   aload_1
       39:   invokevirtual    #4; //Method DOMElement.getParent:( )LDOMElement;
       42:   astore_1
       43:   goto 24
       46:   iconst_0
       47:   ireturn
/* Byte code for "span + span" */
boolean match(DOMElement);
    Code:
        0:   aload_1
        1:   invokevirtual    #2; //Method DOMElement.Type:( )I
        4:   iconst_3
        5:   if_icmpne        27
```

```
8:      aload_1
9:      invokevirtual      #3; //Method DOMElement.getPred:( )LDOMElement;
12:     astore_1
13:     aload_1
14:     ifnull 27
17:     aload_1
18:     invokevirtual      #2; //Method DOMElement.Type:( )I
21:     iconst_3
22:     if_icmpne          27
25:     iconst_1
26:     ireturn
27:     iconst_0
28:     ireturn
```

Compiling Into Machine Code

JIT compilation as such is well known to those with skill in the art, and will not be described in more detail here. As mentioned above, the purpose of JIT here is to improve selector matching performance.

Executing Machine Code For CSS Selector Matching

A browser's internal representation of a CSS ruleset contains a pointer to the executable machine code for the ruleset's selector(s). The execution engine pushes a DOM node to match onto the stack, for instance a call stack, and invokes the executable machine code which returns the result of the match back to the execution engine. For a given selector and a given DOM node, the result is either a match or a no-match. The match decides if a set of CSS properties apply to an element (DOM node) or not. Example where the selector is "span+span":

span+span {
color: red;
display: block;
}

If the selector matches a DOM node, that DOM node is going to get red foreground color and displayed as a block level box.

The overall operation including the present invention may be as follows: A user first inputs or selects a URL via the user interface 201 (see FIG. 2). The URL is received by window and input manager 203 and forwarded to document manager 204 and then forwarded to URL manager 205. URL manager 205 receives data related to the URL from the network or memory. The data received by the URL manager 205 from the network or the memory is then forwarded to parser 210. The parser 210 parses HTML in the data to a parser tree or DOM (tree). Further, selector text that is contained in style sheets of the data is first parsed by means of the selector parser 10, and then transformed into machine code as in FIG. 3 or FIG. 4. Styles are then matched to the nodes or elements of the DOM tree. In a conventional method, styles rules produced by a traditional CSS parser contain a list of selectors and declarations, and the entire list may be traversed for each element to find matches. However, in the present invention as explained above, the machine code representing the selectors is instead invoked for each DOM node to find matches. The layout engine 213 may then use the DOM and the matching result to produce a layout structure. The processed data is finally forwarded by the document manager 204 in order to be rendered by the rendering engine 214 and displayed for the user on the user interface 201.

Applications or uses of the present invention includes, but are not limited to:

Matching of CSS selectors from user agent stylesheets, and stylesheets linked in from markup documents like HTML, XML and SVG.

Matching of CSS selectors against a document's DOM using a query language like the CSS Selectors API.

The person skilled in the art will realize that the present invention by no means is limited to the embodiments described above. On the contrary, many modifications and variations are possible within the scope of the appended claims.

The invention claimed is:

1. A method for Cascading Style Sheet (CSS) selector matching, which method comprises:
receiving content including markup language text and text which includes at least one CSS selector;
parsing the markup language into a Document Object Model (DOM) tree;
parsing the text which includes at least one CSS selector into a data structure representing the at least one CSS selector;
compiling the data structure into machine code; and
executing the machine code to perform the CSS selector matching,
wherein the executing of the machine code comprises:
for each DOM node from said DOM tree,
invoking the machine code for the at least one CSS selector to determine whether each of the at least one CSS selector matches the DOM node, and
for each of the at least one CSS selector determined to match the DOM node, apply a corresponding CSS property to the DOM node.

2. A method according to claim 1, wherein the data structure is a byte-code or an Abstract Syntax Tree (AST).

3. A method according to claim 1, wherein the data structure is compiled into the machine code using Just In Time (JIT) compilation.

4. A method according to claim 1, wherein the text includes several CSS selectors, and wherein only some selectors are compiled based on use of the selectors.

5. A method according to claim 1,
wherein the parsing of the text which includes at least one CSS selector into a data structure representing the at least one CSS selector comprises:
translating each simple constituent of the text which includes at least one CSS selector into one or more byte-code instructions; and
translating combinators of the text which includes at least one CSS selector into control flow instructions and instructions for picking candidate nodes or elements from the DOM for matching.

6. A method according to claim 1, further comprising:
executing or interpreting the data structure to perform the CSS selector matching.

7. A method according to claim 1, wherein the executing of the machine code further comprises or is comprised in:
pushing a DOM node onto a call stack,
invoking the machine code for the at least one CSS selector to determine whether each of the at least one CSS selector matches the DOM node on the stack, and
for each of the at least one CSS selector determined to match the DOM node on the stack, apply a corresponding CSS property to the DOM node on the stack.

8. A method according to claim 1, wherein
the machine code into which the data structure is compiled is a set of instructions directly executable by a computer processor,
the CSS selector matching is performed led by performing the following for each DOM node from said DOM tree:
invoking the computer processor to execute the set of instructions to determine whether each of the at least one CSS selector matches the DOM node, and
for each of the at least one CSS selector determined to match the DOM node, applying the corresponding CSS property to the DOM node.

9. The method according to claim 1, wherein
the method is performed by a web browser,
as the markup language text and the text which includes at least one CSS selector are retrieved by the web browser using a same Universal Resource Locator (URL), and
when parsing the text which includes at least one CSS selector into the data structure, the web browser translates text written in CSS language into a programming language.

10. A computer device for Cascading Style Sheet (CSS) selector matching, which device comprises:
a CSS parser adapted to parse text which includes at least one CSS selector into a data structure representing the at least one CSS selector;
a compiler adapted to compile the data structure into machine code for the particular architecture of the computer device; and
an execution engine adapted to execute the machine code to perform the CSS selector matching,
wherein the execution engine is adapted to perform the following when executing the machine code:
for each DOM node from said DOM tree,
invoke the machine code for the at least one CSS selector to determine whether each of the at least one CSS selector matches the DOM node, and
for each of the at least one CSS selector determined to match the DOM node, apply a corresponding CSS property to the DOM node.

11. A computer device according to claim 10,
wherein said data structure representing the at least one CSS selector is a byte-code or an AST; and
wherein the execution engine is adapted to invoke the machine code for a given CSS selector and a given DOM node or element.

12. A computer device according to claim 10, wherein the execution engine, when executing the machine code, is further adapted to:
push a DOM node onto a call stack,
invoke the machine code for the at least one CSS selector to determine whether each of the at least one CSS selector matches the DOM node on the stack, and
for each of the at least one CSS selector determined to match the DOM node on the stack, apply a corresponding CSS property to the DOM node on the stack.

13. A computer device according to claim 10, wherein
the machine code into which the data structure is compiled is a set of instructions directly executable by a computer processor,
when executing the machine code, the execution engine performs the following for each DOM node from said DOM tree:
invokes the computer processor to execute the set of instructions to determine whether each of the at least one CSS selector matches the DOM node, and
for each of the at least one CSS selector determined to match the DOM node, applies the corresponding CSS property to the DOM node.

14. The computer device according to claim 10, wherein
the CSS parser is implemented in a web browser executed by the computer device,
the text which includes at least one CSS selector is retrieved by the browser using a Universal Resource Locator (URL),
when parsing the text which includes at least one CSS selector into the data structure, the CSS parser translates text written in CSS language into a programming language.

15. A non-transitory computer readable storage medium having code or instructions, which code or instructions when executed on a computer cause(s) a process for Cascading Style Sheet (CSS) selector matching that includes:
receiving content including markup language text and text which includes at least one CSS selector;
parsing the markup language into a Document Object Model (DOM) tree;
parsing the text which includes at least one CSS selector into a data structure representing the at least one CSS selector;
generating machine code by compiling the data structure based on the parsing of the text which includes at least one CSS selector; and
executing the machine code to perform the CSS selector matching,
wherein the executing of the machine code comprises:
for each DOM node from said DOM tree,
invoking the machine code for the at least one CSS selector to determine whether each of the at least one CSS selector matches the DOM node, and
for each of the at least one CSS selector determined to match the DOM node, apply a corresponding CSS property to the DOM node.

16. A non-transitory computer readable storage medium according to claim 15, wherein the executing of the machine code further comprises or is comprised in:
pushing a DOM node onto a call stack,
invoking the machine code for the at least one CSS selector to determine tine whether each of the at least one CSS selector matches the DOM node on the stack, and
for each of the at least one CSS selector determined to match the DOM node on the stack, apply a corresponding CSS property to the DOM node on the stack.

17. A non-transitory computer readable storage medium according to claim 15, wherein
the machine code into which the data structure is compiled is a set of instructions directly executable by a computer processor, the CSS selector matching is performed by performing the following for each DOM node from said DOM tree:
  invoking the computer processor to execute the set of instructions to determine whether each of the at least one CSS selector matches the DOM node, and
  for each of the at least one CSS selector determined to match the DOM node, applying the corresponding CSS property to the DOM node.

18. A non-transitory computer readable storage medium according to claim 15, wherein
the process is performed by a web browser executed on the computer,
as the markup language text and the text which includes at least one CSS selector are retrieved by the browser using a same Universal Resource Locator (URL), and
when parsing the text which includes at least one CSS selector into the data structure, the web browser translates text written in CSS language into a programming language.

* * * * *